(12) United States Patent
Voigt et al.

(10) Patent No.: US 9,622,171 B2
(45) Date of Patent: Apr. 11, 2017

(54) METHOD AND NETWORK NODE FOR SAVING POWER IN A USER EQUIPMENT

(71) Applicant: Telefonaktiebolaget L M Ericsson (publ), Stockholm (SE)

(72) Inventors: Lotta Voigt, Bromma (SE); Eric Andersson, Järfälla (SE); Mathias Sintorn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 276 days.

(21) Appl. No.: 14/506,917

(22) Filed: Oct. 6, 2014

(65) Prior Publication Data

US 2015/0117289 A1    Apr. 30, 2015

(30) Foreign Application Priority Data

Oct. 30, 2013   (EP) .................................... 13190774

(51) Int. Cl.
*H04W 52/02*   (2009.01)
*H04W 72/14*   (2009.01)

(52) U.S. Cl.
CPC ... *H04W 52/0209* (2013.01); *H04W 52/0232* (2013.01); *H04W 72/14* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,060,054 B1* | 11/2011 | Dinan | ............... | H04W 52/0216 455/343.4 |
| 2007/0178875 A1* | 8/2007 | Rao | .................... | H04W 56/0035 455/343.1 |
| 2009/0180414 A1* | 7/2009 | Maeda | ................. | H04B 7/2643 370/311 |
| 2009/0325533 A1* | 12/2009 | Lele | ...................... | G06F 1/3209 455/343.1 |
| 2012/0120843 A1 | 5/2012 | Anderson et al. | | |

(Continued)

FOREIGN PATENT DOCUMENTS

EP    2 076 081 A1    7/2009
EP    2 384 081 A2    11/2011

OTHER PUBLICATIONS

European Search Report, EP Application No. 13190074.3, Mar. 31, 2014.

*Primary Examiner* — Ayaz Sheikh
*Assistant Examiner* — Peter Chau
(74) *Attorney, Agent, or Firm* — Myers Bigel, P.A.

(57) ABSTRACT

A method and network node of a radio network, for enabling a User Equipment (UE) to save power in radio communication with the network node. The network node sets a waiting threshold for the UE and communicates data with the UE over a radio link. The network node also obtains traffic characteristics pertaining to the radio communication, and predicts a waiting time until next data is to be communicated with the UE based on the traffic characteristics. The network node further triggers the UE to enter a Discontinuous Reception (DRX) sleep when the predicted waiting time is longer than the waiting threshold. Thereby, power can be saved in the UE by immediately going to sleep after the last data.

13 Claims, 4 Drawing Sheets

(56) References Cited

U.S. PATENT DOCUMENTS

| | | | |
|---|---|---|---|
| 2012/0231747 A1* | 9/2012 | Chen | H04W 52/0258 455/68 |
| 2013/0201851 A1* | 8/2013 | Chou | H04W 24/02 370/252 |
| 2013/0301500 A1* | 11/2013 | Koc | H04W 76/048 370/311 |
| 2015/0063240 A1* | 3/2015 | Worrall | H04W 72/048 370/329 |

* cited by examiner

METHOD AND NETWORK NODE FOR SAVING POWER IN A USER EQUIPMENT

TECHNICAL FIELD

The present disclosure relates generally to a method and a network node of a radio network, for enabling a User Equipment, UE, to save power in radio communication with the network node.

BACKGROUND

In recent years, different types of radio networks have been developed to provide radio communication for various wireless terminals across different areas. The radio networks, e.g. operating according to Long Term Evolution, LTE, are constantly improved by new functionality to provide better capacity, performance and coverage to meet the demands from subscribers using services and increasingly advanced terminals, such as smartphones, tablets and laptop computers. These terminals contain a typically small and light-weight battery that provides electrical power for radio communication and application handling such as processing of input commands and play-out of media. Due to the weight and size requirements, such batteries have a very limited capacity. In particular, considerable amounts of power are consumed when transmitting and receiving radio signals to and from a serving network node. This power consumption naturally drains the battery and it is often a challenge to minimize or reduce the time that a terminal must be active and consume power to prolong battery life without losing functionality and quality as experienced by the user.

In the field of radio communication, the term User Equipment, UE, is commonly used and will be used in this disclosure to represent any terminal or device capable of radio communication including receiving downlink signals transmitted from a serving network node and sending uplink signals to the network node. Throughout this disclosure, UE could e.g. be exchanged for wireless device which is another common term in this field. The term UE should be interpreted broadly in this disclosure as a communication entity that basically communicates by radio access with network nodes. Thus, a UE in this context is not necessarily held and operated by a human user but it could also be a machine-to machine type of device operating automatically.

Further, the term "network node", also commonly referred to as a base station, radio node, e-nodeB, eNB, etc., represents any node for providing radio access in a radio network that can communicate uplink and downlink radio signals with UEs. The radio network may, without limitation, also be referred to as a cellular network or a mobile network. The network nodes described in this disclosure may include so-called macro nodes and low power nodes such as micro, pico, femto, Wifi and relay nodes, to mention some customary examples. Throughout this disclosure, network node could e.g. be exchanged for base station.

As indicated above, various solutions are available to minimize or reduce the power consumption in a UE. A key example of that is the functionality for Discontinuous Reception, DRX, where the UE turns off and on its receiver according to a predefined DRX scheme. In this scheme, "on-duration" denotes a relatively short period when the UE's receiver must be switched on, e.g. in order to receive some message or data from the network node if needed, or to measure signals, while "off-duration" denotes a relatively longer period when the receiver can remain switched off. A DRX cycle is defined as one on-duration period and one off-duration period which both have predefined lengths. Radio signals can thus only be received by the UE during the on-duration periods but not during the off-duration periods. A main purpose of applying DRX is that the UE naturally saves power during the off-duration periods by not having its receiver switched-on, and also resources in the network will not be occupied for the UE during the off-duration periods.

Figure 1:
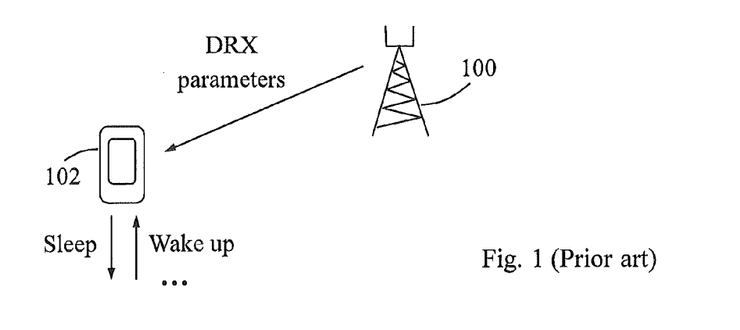
FIG. 1 is a communication scenario illustrating the DRX feature, according to the prior art.

The DRX feature and resulting UE behavior are governed by various DRX parameters, e.g. specifying the length of the on-duration and off-duration periods, among other things, and the DRX parameters are typically configured in the UE by signaling from its serving network node, e.g. for Radio Resource Control, RRC, which is illustrated in FIG. 1. The network node 100 thus sends valid DRX parameters to the UE which in turn goes to sleep and wakes up, i.e. in terms of reception, according to the occurrence of respective off-duration and on-duration periods as defined by the signaled DRX parameters. The UE thus performs this when it leaves an active state and enters a DRX mode which happens under certain circumstances, as defined by the DRX parameters.

Figure 2:
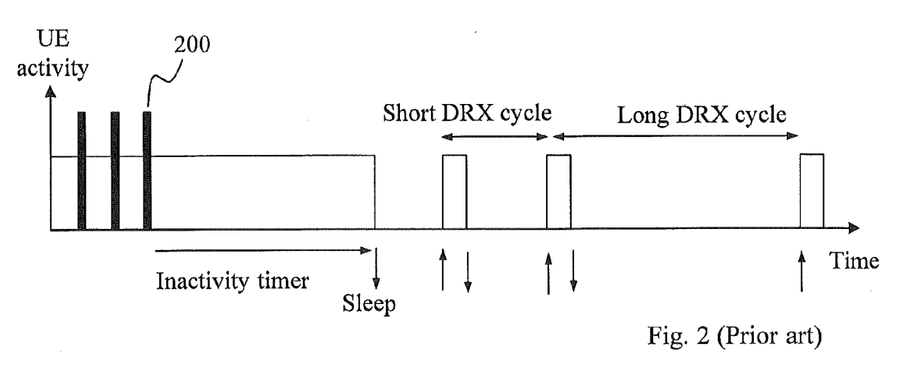
FIG. 2 is a schematic diagram illustrating activity over time in a UE when applying DRX, according to the prior art.

In more detail, the DRX parameters typically include a parameter called "inactivity timer" which should be started after each completed activity in the UE such as transmission or reception of data or a message or a measurement. For example according to current procedures, the Inactivity timer may be started at the reception of a downlink packet and at the reception of an uplink grant. If there comes another packet just after the first one, the inactivity timer is restarted. FIG. 2 illustrates by a time-activity diagram where 200 denotes a latest activity, such as a transmission or reception, by the UE. If the UE remains inactive after this activity 200 until the inactivity timer expires, i.e. not transmitting or receiving any signals, the UE will enter a state of following the DRX cycle which is fixed in time for the UE. In this case, the UE goes to sleep when the inactivity timer expires, shown by a down arrow, and then following the fixed DRX cycle of sleeping and waking up, i.e. turning off and on its receiver, as shown by a succession of down and up arrows.

In this figure, so-called short and long DRX cycles are shown for illustrative purposes which the UE may apply according configuration. The UE is typically configured to apply the short DRX cycle initially and then the long DRX cycle later when remaining inactive even longer since the likelihood of activity decreases over time.

The radio communication of today is becoming more and more based on the Internet Protocol, IP, which means that a UE may be active in radio communication intermittently and is thus frequently switching between periods of activity and periods of inactivity. As a result, the UE may often be in the DRX sleeping state for very short periods, i.e. after the inactivity timer has expired, before it must return to active state again by turning on the receiver for receiving signals. In that case, the inactivity timer causes the UE's receiver to be on and consume power for a significant part of each inactive period. It is therefore a problem that UEs often consume considerable power even when DRX is applied. On the other hand, the inactivity timer is needed to avoid latency in the radio communication by controlling the UE to enter the DRX sleeping state not too soon when there might be further signals to receive.

SUMMARY

It is an object of embodiments described herein to address at least some of the problems and issues outlined above. It is possible to achieve this object and others by using a method and a network node as defined in the attached independent claims.

According to one aspect, a method is performed by a network node of a radio network, for enabling a User Equipment, UE, to save power in radio communication with the network node. In this method, the network node sets a waiting threshold for the UE. The network node further communicates data with the UE over a radio link and obtains traffic characteristics pertaining to the radio communication. Upon communicating the data, the network node predicts a waiting time until next data is to be communicated with the UE based on the traffic characteristics, and triggers the UE to enter a Discontinuous Reception, DRX, sleep when the predicted waiting time is longer than the waiting threshold by sending a sleep command to the UE. Thereby, the UE is able to save more power by going to DRX sleep immediately after the last data, as compared to waiting for an inactivity timer to expire before going to DRX sleep.

According to another aspect, a network node of a radio network is arranged to enable a UE to save power in radio communication with the radio node. The network node comprises a logic unit that is configured to set a waiting threshold for the UE, a radio circuitry that is configured to communicate data with the UE over a radio link, and an obtaining unit that is configured to obtain traffic characteristics pertaining to the radio communication. The logic unit is further configured to predict a waiting time until next data is to be communicated with the UE based on the traffic characteristics, and to trigger the UE to enter a DRX sleep when the predicted waiting time is longer than the waiting threshold by sending a sleep command to the UE.

The above method and network node may be configured and implemented according to different optional embodiments e.g. to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

In this disclosure, a solution is presented where it has been recognized that the above-described DRX parameters, including the inactivity timer which is virtually fixed and static, may not be optimal or suitable for all traffic situations which may vary dependent on, e.g., a current radio environment, such as interference, and also on what services and applications the UE is currently using and what capabilities it has. In particular, the statically configured inactivity timer may have an inappropriate length for the current traffic situation such that the UE goes to sleep too soon or too late which could result in unwanted latency or excessive power consumption, respectively.

For example, if the UE goes to DRX sleep according to the static inactivity timer too soon such that a next communication with the UE is imminent at that moment, the UE may have to wait until the next on-period in the DRX cycle before the next communication can be executed or scheduled. This situation may thus result in unacceptable latency, i.e. waiting time before the communication can be executed, also reducing throughput of data, whereas not much power has been saved. On the other hand, if the static inactivity timer proves to be too long to suit a situation where packets are communicated fairly frequently but with long enough intervals to make the inactivity timer expire now and then, the UE will seldom or never go to DRX sleep for any length of time due to frequent activities, thus not saving power as desired. In any case, the UE must wait with going to DRX sleep until the inactivity timer expires such that it consumes power during the entire expiry period.

In this solution, a network node serving the UE basically operates to enable the UE to enter DRX sleep immediately after an activity has been completed by the UE, e.g. after transmission or reception of data or a measurement, if it can be gathered that the next communication with the UE is not expected to occur until after a certain time limit, hereafter called a waiting threshold. This is done by predicting a waiting time until next data is expected to be communicated with the UE, given the circumstances of the radio communication, and checking whether the predicted waiting time exceeds the waiting threshold. If so, the UE is ordered to go into DRX sleeping state immediately and then follow the DRX cycle, that is without waiting for the inactivity timer to expire. Thereby, more power can be saved by the early DRX sleep as compared to waiting for the inactivity timer to expire. The waiting threshold may be set depending on various UE-related factors and/or other things, which will be explained in more detail later below.

An example of a procedure with actions performed by a network node of a radio network to accomplish the above, will now be described with reference to the flow chart in FIG. 3. This procedure thus enables a UE to save power in radio communication with the network node in a beneficial manner. It is assumed that the network node, such as a base station or similar, is currently serving the UE with radio access and that a connection has been established with the UE.

A first action 300 illustrates that the network node sets a waiting threshold for the UE, which threshold will control the UE's DRX sleep behavior in a manner to be described below. In a next shown action 302, the network node communicates data with the UE, e.g. by sending data to the UE or receiving data from the UE, or both. In this context, "data" should be understood broadly to represent any information e.g. related to payload or signaling. This action thus implies a latest activity performed by the UE in terms of communication.

In a further action 304, the network node obtains traffic characteristics that somehow pertain to the radio communication with the UE. Action 304 may be executed more or less at the same time, or even somewhat before e.g. on a continuous basis, as action 302 of the latest UE activity. At least some of the traffic characteristics may be measured in real-time, e.g. by the network node and/or by the UE. Some useful but non-limiting examples of traffic characteristics that may be obtained in this action 304 are presented below.

A) One or more services being used by the UE may contribute to the traffic characteristics in that a certain service may require a certain amount or pattern of information to be communicated, e.g. at certain points in time.

B) One or more applications used in the UE may contribute in a similar manner to the traffic characteristics in that a certain application may require a certain amount or pattern of information to be communicated.

C) A radio environment of the radio communication, which may vary more or less significantly e.g. in terms of bandwidth, interference, path loss, coverage, and so forth.

D) A traffic pattern of communicating packets in the radio communication, e.g. depending on time between successive packets, packet size, direction i.e. uplink or downlink, and the number of pending packets in a transmission buffer.

E) Capabilities of the UE, e.g. modulation and coding/decoding abilities, supported number of data streams, support for carrier aggregation and Multiple Input Multiple Output, MIMO.

F) A user behaviour in the radio communication, e.g. pertaining to how the user activates and interacts with an application.

However, the traffic characteristics that could be obtained in action 304 are not limited to the above examples A-F.

In a next action 306, the network node predicts a waiting time "P" until next data is expected to be communicated with the UE, either in uplink or downlink, based on the traffic characteristics. The network node may thus predict a waiting time right after an activity has been performed and completed by the UE, typically a transmission or reception of data, as of action 302 above. In some possible embodiments, the network node may predict the waiting time upon a downlink transmission of data to the UE, or upon an uplink scheduling grant to the UE, or upon a transmission of data from the UE.

Further possible embodiments include predicting the waiting time by entering the obtained traffic characteristics into a prediction model that has been created from traffic statistics collected over time in the radio network. It is thus possible to build a prediction model or algorithm from traffic statistics reflecting various features of the traffic occurring over time in the network. Briefly described, the prediction model can be created basically in two stages: extraction of traffic features in the network and training of the model, which will be described in more detail later below.

In a following action 308, the network node determines whether the predicted waiting time P from action 306 is longer than, i.e. exceeds, the above-mentioned waiting threshold which has been set for the radio communication with the UE. If not, the network node just waits until the next data is communicated with the UE, that is by returning essentially to action 302 as shown in the figure.

On the other hand, in case it is determined in action 308 that the predicted waiting time is longer than the waiting threshold, the network node triggers the UE to enter DRX sleep, in an action 310, by sending a sleep command to the UE. It is thus assumed that the DRX sleep is efficient to apply when the UE is expected to remain inactive, i.e. before it is time to communicate the next data, for a sufficiently long time at least longer than the waiting threshold. In action 310, the UE will enter DRX sleep earlier than if it had to wait for the inactivity timer to expire, thus saving extra power by the above early DRX sleep. In a possible implementation, the sleep command sent from the network node may be a MAC control element that can be used to force the UE to go into immediate, i.e. early, sleep right after a data communication has been completed. This element is commonly called the "DRX Command MAC Control element" where MAC is short for Medium Access Control. The DRX Command MAC control element as such has been defined for communication using the well-known MAC protocol.

In order to apply the DRX function in an efficient manner, e.g. to achieve benefits in terms of power saving with not too much latency, the solution allows for setting the waiting threshold to be more or less optimal for the UE given the prevailing circumstances, as of action 300. For example, the network node may set the waiting threshold in action 300 based on characteristics of the UE, which may be obtained e.g. from a user database in the network, or from stored statistics of measurements, or by signaling with the UE, or by a suitable combination of the above examples. To mention some possible examples, the characteristics of the UE may include at least one of: a traffic pattern of the UE, a latency tolerated by a service or application used in the UE, and an expected length of ramp-up and ramp-down periods of the UE between sleep state and awake state. The traffic pattern of the UE may be predictable and dependent on the service or application used in the UE.

The ramp-up period refers to the time it takes for the UE receiver to warm-up and reach full operation power after being switched on, while the ramp-down period refers to the time it takes for the UE receiver to cool down and reach zero power after being switched off. Although these ramp-up and ramp-down periods may for some types of UEs have little significance for the DRX sleep functionality, it may sometimes be helpful to take them into consideration when setting the waiting threshold for a particular UE. If the UE is of a type that requires relatively short ramp-up and ramp-down periods, the waiting threshold may be set relatively short since the UE is able to save relatively much power when forced to DRX sleep and between the on-duration periods and off-duration periods in the DRX cycle. On the other hand, if the UE is of a type that requires relatively long ramp-up and ramp-down periods, the waiting threshold may be set somewhat longer since the UE is not able to save as much power anyway when forced to DRX sleep and between the on-duration periods and off-duration periods in the DRX cycle, in case the next communication is predicted to come shortly and there is no point in sending the UE to sleep for a very short time. In the latter case there may also be latency problems if the UE takes long time to ramp up.

In another possible embodiment, the network node may set the waiting threshold in action 300 based on an expected "cost" for sending the sleep command to the UE in terms of bandwidth and resource usage. This cost may be determined as the amount of air interface bandwidth and/or network resources that is required for conveying the actual sleep command to the UE. The waiting threshold may thus be set in a more or less optimal manner to provide a beneficial trade-off between the cost for sending the sleep command and the gain from saving power in the UE.

In yet another embodiment, the network node applies an inactivity timer for the UE that is longer than the waiting threshold Th. The waiting threshold Th should thus be set shorter than the inactivity timer. Thereby, the UE will start following the DRX cycle when the inactivity timer expires in case the predicted waiting time until communication of next data was incorrect and too short and no communication, has occurred before the inactivity timer has expired. In this way, the UE will effectively revert to applying the inactivity timer in a conventional manner if the predicted waiting time is shorter than the waiting threshold Th but the real waiting time until communication of the next data turns out to be longer than both the waiting threshold Th and the inactivity timer, that is, the communication does not actually occur as predicted. By using the inactivity timer effectively as a fall-back in this manner, the UE will save power anyway to some extent by eventually going to DRX sleep even if the waiting time until next communication could not be predicted correctly for whatever reason. The solution described herein may thus effectively be used as an added feature to the regular DRX functionality with the inactivity timer.

Figure 4:
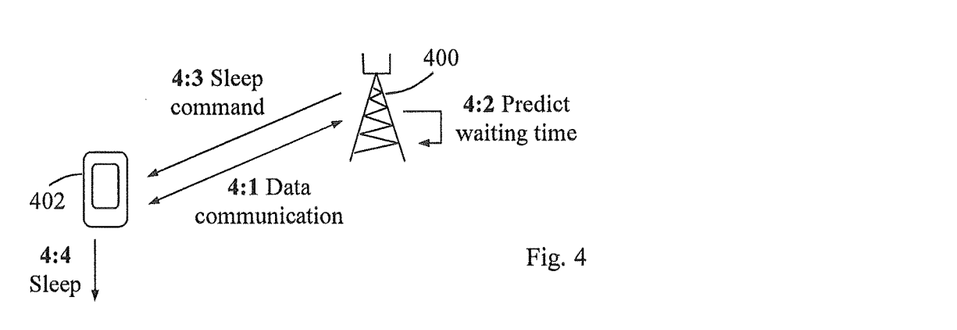
FIG. 4 is another communication scenario illustrating signaling and actions in a radio communication between a network node and a UE, according to further possible embodiments.

FIG. 4 illustrates in a simplified manner how a network node 400 serving a UE first communicates data with the UE over a radio link in a first action 4:1, and then predicts a waiting time until next data is to be communicated with the UE based on traffic characteristics, in another action 4:2. If the predicted waiting time is longer than a waiting threshold set for the UE, the network node 400 triggers the UE to enter DRX sleep by sending a sleep command to the UE, in a following action 4:3. As a result, the UE goes to DRX sleep immediately, in an action 4:4.

Figure 5:
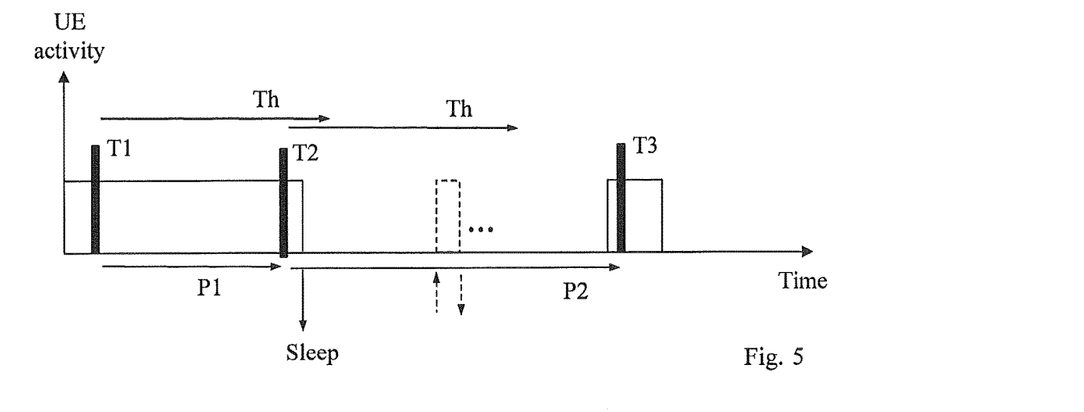
FIG. 5 is another schematic diagram illustrating activity over time in a UE when embodiments herein are used.

This series of events when using the solution are also suggested schematically in a time—activity diagram of FIG. 5, which can be compared with the diagram of FIG. 2 which illustrates how the UE is active over time when the conventional DRX procedure is used. In the example of FIG. 5, it is assumed that the waiting time is predicted correctly throughout for simplicity and that a waiting threshold denoted "Th" has been set for the UE.

The UE has initially its receiver turned on and receives data T1 from its serving network node. The network node then predicts the waiting time "P1" until next data T2 will be transmitted to the UE. However, the predicted waiting time P1 is in this case shorter than the waiting threshold Th, as shown in the figure, and therefore no sleep command is sent to the UE after the communication of T1 and its receiver remains on. When the next communication T2 is executed, the network node again predicts another waiting time "P2" unit next communication of data T3 will occur. This time, the predicted waiting time P2 is longer than the waiting threshold Th, also apparent from the figure, and in this case a sleep command is sent to the UE after the communication of T2.

In FIG. 5, it can be seen that the UE goes to sleep right after the communication T2 when this solution is employed, and does not remain turned on during the length of a conventional inactivity timer that was shown in FIG. 2. Thereby, the UE will save more power than in the conventional DRX procedure of FIG. 2. The dashed lines schematically illustrate that the UE follows a DRX scheme fixed in time after going to DRX sleep according to the sleep command.

Figure 6:
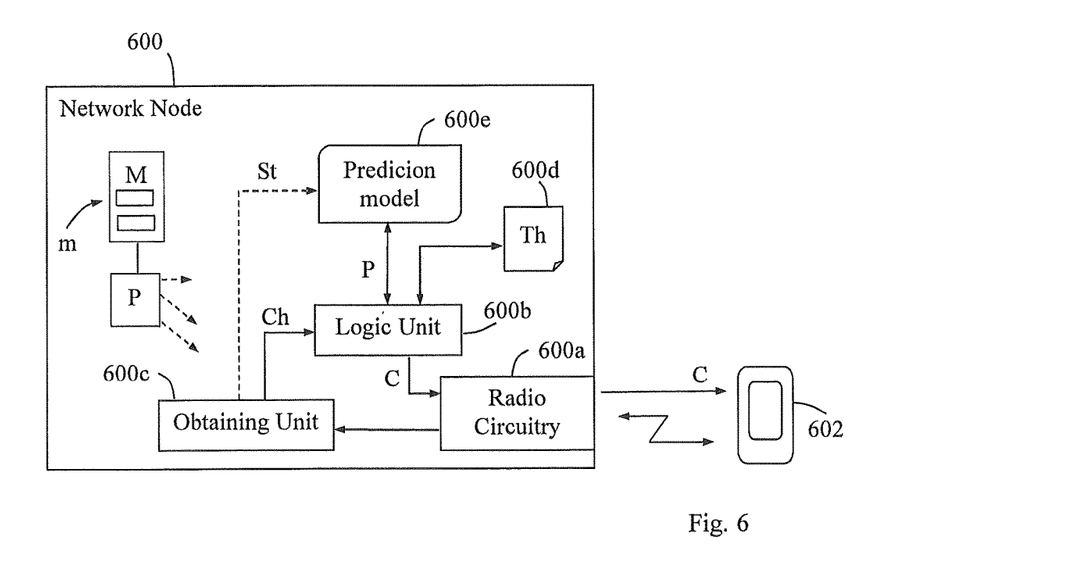
FIG. 6 is a block diagram illustrating a network node in more detail, according to further possible embodiments.

A detailed but non-limiting example of how a network node of a radio network may be structured with some possible functional units to bring about the above-described operation of the network node, is illustrated by the block diagram in FIG. 6. In this figure, the network node 600 is arranged for enabling a UE 602 to save power in radio communication with the radio node. The network node 600 may be configured to operate according to any of the examples and embodiments of employing the solution as described above and as follows.

The network node 600 comprises a suitable radio circuitry 600a for conducting radio communication with the UE 602 which may be done in a conventional manner. The network node 600 also comprises a logic unit 600b configured to set a waiting threshold 600d for the UE 602, e.g. according to any of the embodiments described for action 300 above. The radio circuitry 600a is configured to communicate data with the UE over a radio link, as of action 302 above. The network node 600 also comprises an obtaining unit 600c configured to obtain traffic characteristics pertaining to the radio communication, e.g. according to any of the embodiments described for action 304 above.

The logic unit 600b is further configured to predict a waiting time "P" until next data is to be communicated with the UE based on the traffic characteristics, e.g. as described for action 300 above. Some examples of traffic characteristics have been described above. As mentioned above, the waiting time may be predicted by entering the obtained traffic characteristics in a prediction model 600e that has been created from traffic statistics "St" collected over time in the radio network, e.g. provided by the obtaining unit 600c as indicated by a dashed arrow. The logic unit 600b is also configured to trigger the UE 602 to enter a DRX sleep when the predicted waiting time is longer than the waiting threshold 600d by sending a sleep command "C", e.g. a MAC control element, to the UE 602.

Figure 7:
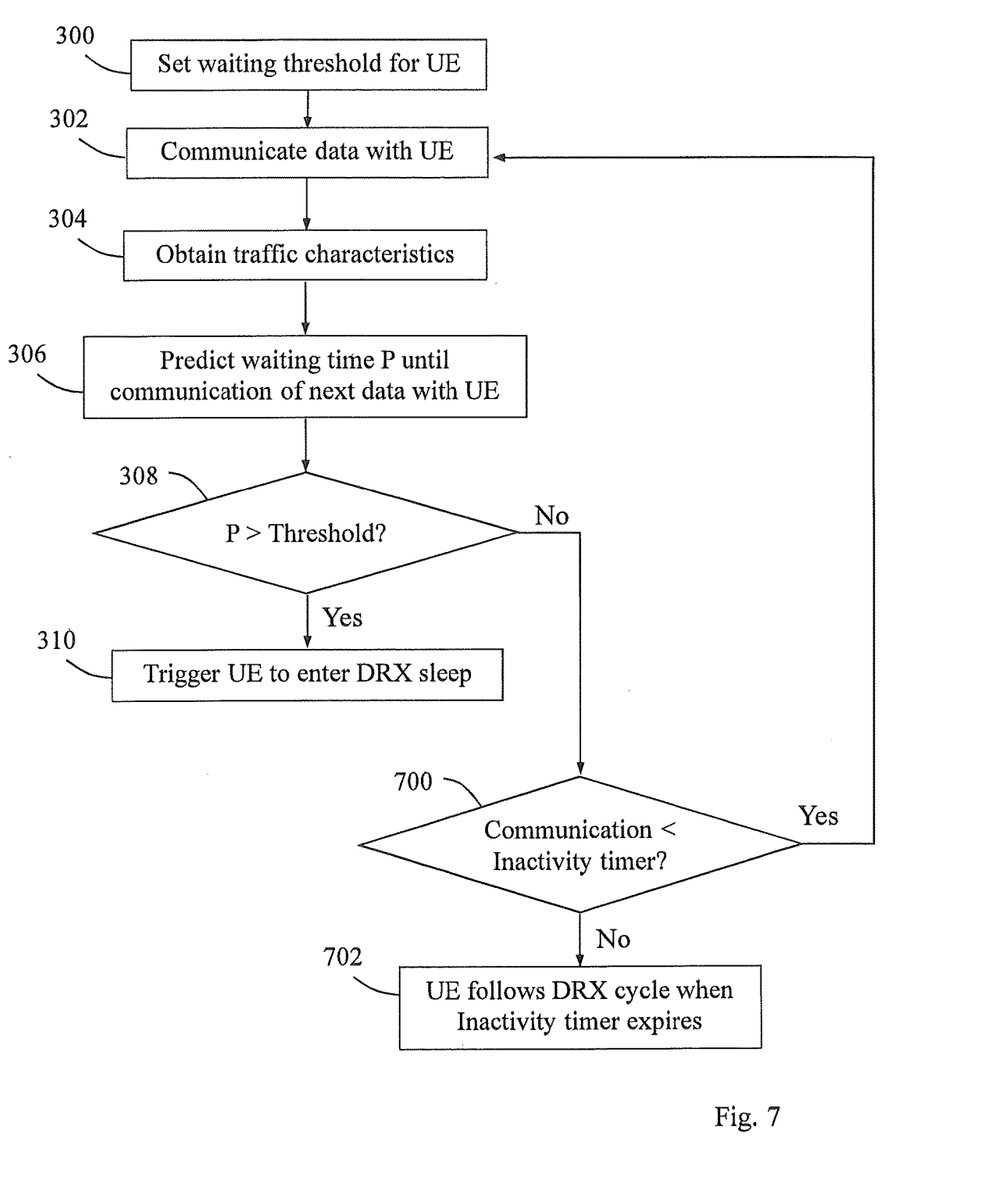
FIG. 7 is a more detailed flow chart with actions performed by a network node, according to further possible embodiments.
Figure 8:
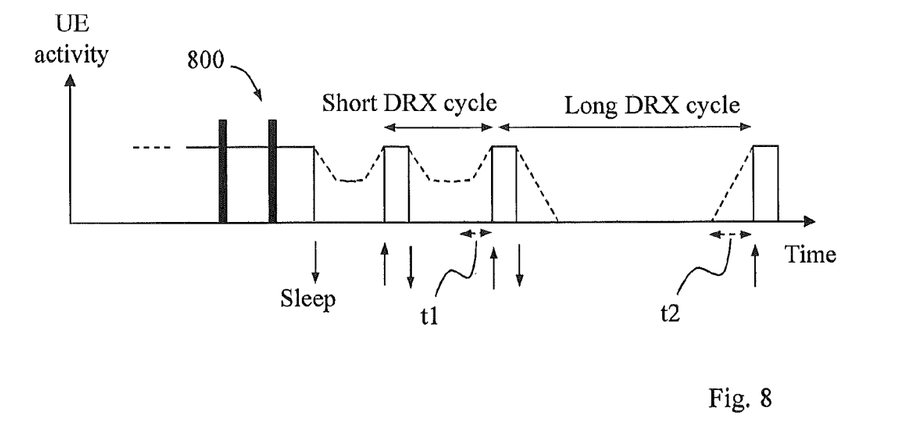
FIG. 8 illustrates how receiver activity and corresponding power consumption in the UE varies over time including ramp-up and ramp-down periods before and after, respectively, the receiver's on-duration periods.

The above network node 600 and its functional units may be configured or arranged to operate according to various optional embodiments such as those described above illustrated by FIGS. 3-5 and further embodiments and examples to be described below with reference to FIGS. 7 and 8. In a possible embodiment, the logic unit 600b may be configured to set the waiting threshold 600d for the UE based on characteristics of the UE. Some examples of characteristics of the UE have been described above. In another possible embodiment, the logic unit 600b may be configured to set the waiting threshold 600d for the UE based on an expected cost for sending the sleep command to the UE in terms of bandwidth and resource usage.

In further possible embodiments, the logic unit 600b may be configured to predict the waiting time upon a downlink transmission of data to the UE or upon an uplink scheduling grant to the UE or upon a transmission of data from the UE. The logic unit 600b may be further configured to predict the waiting time by entering the obtained traffic characteristics in a prediction model 600e that has been created from traffic statistics "St" collected over time in the radio network, as schematically indicated by a dashed arrow. The logic unit 600b may also be configured to apply an inactivity timer for the UE that is longer than the waiting threshold, basically in the manner described above.

It should be noted that FIG. 6 illustrates some possible functional units in the network node 600 and the skilled person is able to implement these functional units in practice using suitable software and hardware. Thus, the solution is generally not limited to the shown structures of the network node 600, and the functional units 600a-c may be configured to operate according to any of the features described in this disclosure, where appropriate.

Figure 3:
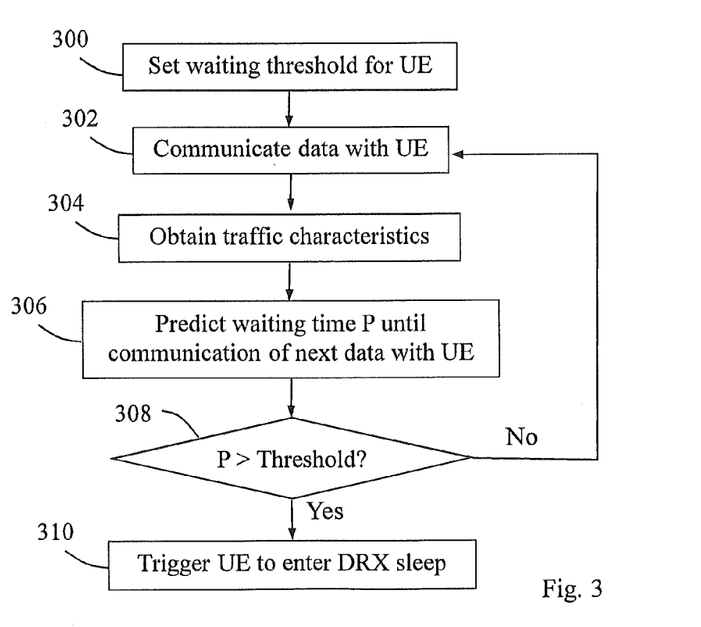
FIG. 3 is a flow chart with actions performed by a network node, according to some possible embodiments.

The embodiments and features described herein may be implemented in a computer program comprising computer readable code which, when run on a network node, causes the network node to perform the above actions e.g. as described for FIGS. 3 to 5. Further, the above-described embodiments may be implemented in a computer program product comprising a computer readable medium on which a computer program is stored. The computer program product may be a compact disc or other carrier suitable for holding the computer program. The computer program comprises computer readable code which, when run on a first radio node, causes the network node 600 to perform the above actions. Some examples of how the computer program and computer program product can be realized in practice are outlined below.

The functional units 600a-c described above for FIG. 6 may be implemented in the network node 600 by means of program modules of a respective computer program comprising code means which, when run by a processor "P" causes the network node 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the network node 600 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the network node 600.

It will now be described, with reference to the flow chart in FIG. 7, a more detailed example of how the above solution may be applied for enabling a UE to save power in radio communication with a network node, e.g. the above-described network node 400 or 600 and the above-described UE 402 or 602. It was mentioned above that an inactivity timer is used as a fall-back in order to save power in the UE in accordance with the regular DRX functionality by going to DRX sleep when it expires even if the waiting time until next communication was not predicted correctly such that the predicted communication did not occur as expected. This example of FIG. 7 illustrates how the inactivity timer would be employed in this case.

The actions 300-310 are the same as in FIG. 3 and they are therefore not necessary to describe here again. Of interest in this example is however the case when it is found in action 308 that the predicted waiting time P does not exceed the waiting threshold. If then it is found in an action 700 that the communication of data actually will occur before the inactivity timer expires, the process returns to action 302 of communicating the data, and another prediction of waiting time will be performed, and so forth. On the other hand, If it is found in action 700 that the communication of data will not occur before the inactivity timer expires, the UE will start following the DRX cycle as soon as the inactivity timer expires according to regular procedures, as shown by an action 702.

It was mentioned above that the waiting time may be predicted by entering the obtained traffic characteristics into a prediction model that has been created from traffic statistics collected over time in the radio network, and that such a prediction model can be created in two stages including extraction of traffic features and training of the model, see e.g. the prediction model 600e in FIG. 6. These two stages and the following prediction of waiting time may be performed by using existing procedures which are known as such. An example of such a known procedure that may be used when implementing the solution in practice is outlined in more detail below.

1. Feature Extraction

Raw data is extracted for each data packet that is communicated, such as a timestamp for packet arrival, size of the packet, whether it is communicated in uplink or downlink etc. This raw data needs to be transformed into a feature vector that can be entered into the prediction model. If a pattern is to be described by this feature vector, it is necessary to use raw data from several data packets, e.g. by using a sliding window for the feature extraction. This sliding window can for example cover the last x number of packets or the last y seconds. Interesting characteristics that describe the pattern of communication in a way that is relevant, are then calculated from the raw data, for example inter arrival times between packets. It may be inter arrival times between uplink packets, between downlink packets, or between uplink and downlink packets. One way of describing these inter arrival times could be to create a histogram vector and use that vector as the feature vector. Another example of defining a feature or characteristics could be to perform a suitable discrete Fourier transform that describes the stream of packets in the frequency domain.

2. Training

For the training stage, pairs of feature vectors and the corresponding time for the next packet arrival are collected. The goal is to train a machine learning model by saying "For feature vector x, I want you to output waiting time y to next packet". This problem is a machine learning problem which lies outside the scope of this disclosure, but several possible algorithms are available. The training may be performed online, that is, as soon as a new feature vector is created and a corresponding waiting time to next packet is determined, the model can be updated. If this is not possible, i.e. due to resource limitations, the information may be saved and training may be performed offline, e.g. during the night.

3. Prediction

Whenever a new feature vector is obtained, it is entered into the trained machine learning model. The resulting output of the model is an estimation of the time to next packet arrival. This value may then be used by the logic described in this disclosure to make a decision of whether a MAC control element should be sent to the UE or not.

It was also mentioned above that the waiting threshold may in some cases be set depending on an expected length of ramp-up and ramp-down periods of the UE between sleep state and awake state, e.g. in order to achieve power saving without too much latency. In this context, the waiting threshold may thus be set with respect to latency requirements and an expected periodicity of activities in the used service or application. FIG. 8 illustrates how receiver activity and corresponding power consumption in the UE varies over time including ramp-up and ramp-down periods before and after, respectively, the receiver's on-duration periods. When the UE is asleep during the off-duration periods, the power consumption is shown by dashed lines and a ramp-up period is needed when the UE switches on the receiver before each on-duration period, followed by a ramp-down period when the UE switches off its receiver after each on-duration period.

The UE goes into light sleep during a short DRX cycle, i.e. the power does not completely reach zero due to the relatively short time between the ramp-down and ramp-up periods, while the UE goes into deep sleep during a long DRX cycle, i.e. the power goes down virtually to zero. Therefore, more power is saved during the long DRX cycle than during the short DRX cycle. It can also be seen that the ramp-up period t1 at the end of a short DRX cycle may be somewhat shorter than the ramp-up period t2 at the end of a long DRX cycle.

As explained above, the waiting threshold may be set relatively short for a UE that has relatively short ramp-up and ramp-down periods since that UE will be quick to ramp down and save power, while it is better set the waiting threshold longer for a "slow" UE that has relatively long ramp-up and ramp-down periods. In the latter case, there is no point in sending the UE to sleep for a very short time since the UE will not get time to ramp-down fast enough to save much power anyway, hence also avoiding another sleep command to be communicated over the air interface. Further, a slow UE should not be sent to sleep too frequently in order since it may result in excessive latency.

While the solution has been described with reference to specific exemplary embodiments, the description is generally only intended to illustrate the inventive concept and should not be taken as limiting the scope of the solution. For example, the terms "network node", "User Equipment, UE", "discontinuous reception, DRX", "DRX sleep", "communication activity", "time limit", "sleep command", "inactivity timer", "prediction model" and "MAC control element" have been used in this description, although any other corresponding entities, functions, and/or parameters could also be used having the features and characteristics described here. The solution is defined by the appended claims.

The invention claimed is:

1. A method performed by a network node of a radio network, for enabling a User Equipment (UE) to save power in radio communication with the network node, the method comprising:
   setting a waiting threshold for the UE, wherein setting the waiting threshold for the UE is based at least in part on an expected cost, in terms of bandwidth and resource usage, for sending a sleep command to the UE,
   communicating data with the UE over a radio link,
   obtaining traffic characteristics pertaining to the radio communication,
   predicting a waiting time until next data is to be communicated with the UE based on the traffic characteristics, and
   triggering the UE to enter a Discontinuous Reception (DRX) sleep when the predicted waiting time is longer than the waiting threshold by sending the sleep command to the UE.

2. The method according to claim 1, wherein setting the waiting threshold for the UE is further based on characteristics of the UE, wherein the characteristics of the UE include at least one of:
   an expected length of ramp-up and ramp-down periods of the UE between sleep state and awake state,
   a traffic pattern of the UE, and
   a latency tolerated by a service used in the UE.

3. The method according to claim 1, wherein the traffic characteristics pertain to at least one of:
   one or more services used by the UE,
   one or more applications used in the UE,
   a radio environment of the radio communication,
   a traffic pattern of communicating packets in the radio communication,
   capabilities of the UE, and
   a user behavior in the radio communication.

4. The method according to claim 1, wherein the predicting of the waiting time until the next data is to be communicated with the UE is based on at least one of:
   a downlink transmission of data to the UE,
   an uplink scheduling grant to the UE, and
   a transmission of data from the UE.

5. The method according to claim 1, wherein sending the sleep command to the UE comprises sending a Medium Access Control (MAC) element.

6. The method according to claim 1, wherein predicting the waiting time comprises entering the traffic characteristics in a prediction model that has been created from traffic statistics collected over time in the radio network.

7. The method according to claim 1, further comprising applying an inactivity timer for the UE that is longer than the waiting threshold.

8. A network node of a radio network, the network node being arranged for enabling a User Equipment (UE) to save power in radio communication with the network node, the network node comprising:
   a processor; and
   memory storing computer-readable instructions that, when executed by the processor, cause the network node to perform operations comprising:
   setting a waiting threshold for the UE, wherein setting the waiting threshold for the UE is based at least in part on an expected cost, in terms of bandwidth and resource usage, for sending a sleep command to the UE,
   communicating data with the UE over a radio link, and
   obtaining traffic characteristics pertaining to the radio communication,
   predicting a waiting time until next data is to be communicated with the UE based on the traffic characteristics, and
   triggering the UE to enter a Discontinuous Reception (DRX) sleep when the predicted waiting time is longer than the waiting threshold by sending the sleep command to the UE.

9. The network node according to claim 8, wherein setting the waiting threshold for the UE is based on characteristics of the UE, wherein the characteristics of the UE include at least one of:
   an expected length of ramp-up and ramp-down periods of the UE between sleep state and awake state,
   a traffic pattern of the UE, and
   a latency tolerated by a service used in the UE.

10. The network node according to claim 8, wherein the traffic characteristics pertain to at least one of:
    one or more services used by the UE,
    one or more applications used in the UE,
    a radio environment of the radio communication,
    a traffic pattern of communicating packets in the radio communication,
    capabilities of the UE, and
    a user behavior in the radio communication.

11. The network node according to claim 8, wherein the predicting of the waiting time until the next data is to be communicated with the UE is based on at least one of:
    a downlink transmission of data to the UE,
    an uplink scheduling grant to the UE, and
    a transmission of data from the UE.

12. The network node according to claim 8, wherein predicting the waiting time comprises entering the traffic characteristics in a prediction model that has been created from traffic statistics collected over time in the radio network.

13. The network node according to claim 8, wherein the memory stores further computer-readable instructions that, when executed by the processor, cause the network node to perform operations comprising applying an inactivity timer for the UE that is longer than the waiting threshold.

* * * * *